BURKET & GASKELL.
Wheel-Plow.
No. 61,151. Patented Jan. 15, 1867.
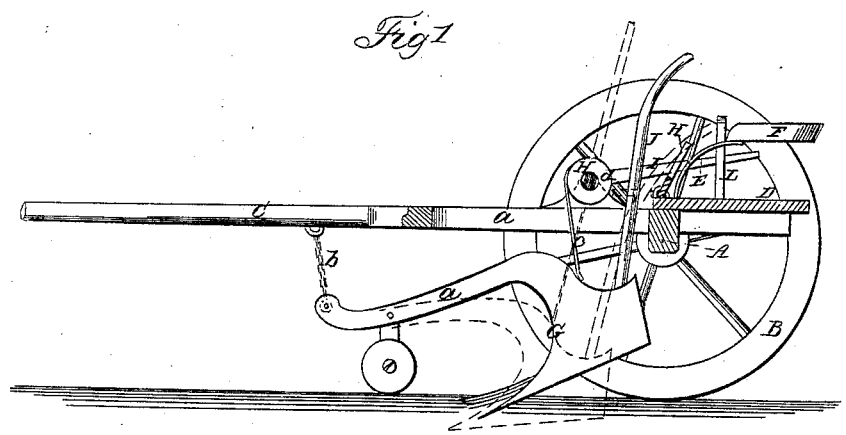
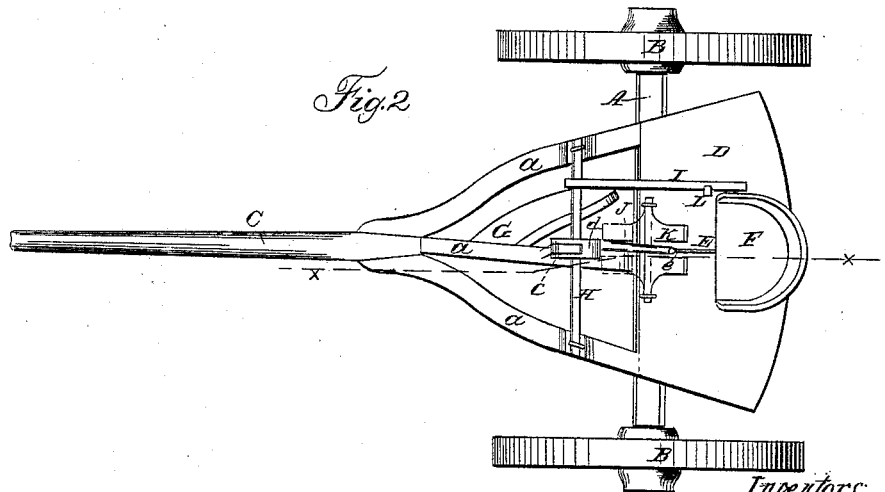

United States Patent Office.

GEORGE BURKET AND SAMUEL M. GASKILL, OF BLUFFTON, OHIO.

Letters Patent No. 61,151, dated January 15, 1867.

IMPROVEMENT IN SULKY-PLOUGHS.

*The Schedule referred to in these Letters Patent and making part of the same.*

TO ALL WHOM IT MAY CONCERN:

Be it known that we, GEORGE BURKET and SAMUEL M. GASKILL, of Bluffton, in the county of Allen, and State of Ohio, have invented a new and improved Sulky-Plough; and we do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, fig. 2.

Figure 2 a plan or top view of the same.

Similar letters of reference indicate corresponding parts.

This invention relates to a new and improved plough of that class which are connected to a frame mounted on wheels, so that the ploughman may ride and drive while manipulating the plough, and which are commonly termed sulky-ploughs. The invention consists in the peculiar construction and arrangement of the parts, as herein fully shown and described, whereby the plough may be manipulated with the greatest facility and a very simple and efficient implement or device of the class specified obtained.

A represents an axle having a wheel, B, at each end of it, and a draught pole, C, connected by hounds, $a\ a$, the latter extending back of the axle and having a platform, D, secured to it, on which the elastic support E for the driver's seat F is attached. G represents a plough, which may be constructed in the usual manner, and has the front end of its beam, $a$, attached to the draught pole C by a chain or rope, $b$. The rear part of the beam has a chain or rope, $c$, attached to it, which is connected to a pulley, $d$, on a shaft, H, the bearings of which are on the rear parts of the hounds $a\ a$. The shaft H has a hand-lever, I, fitted upon it, which extends back within convenient reach of the driver on seat F. The plough G has a handle, J, attached to it, which extends upward, and is also within convenient reach of the driver on seat F. Said handle J passes through a slot, $e$, in a plate, K, which is hinged to the platform D or attached to it in such a manner that it may be turned forward and backward thereon, said plate being turned backward when it is necessary to release the plough handle J. This slotted plate K serves as a bearing or fulcrum for the plough handle, admitting of the plough being adjusted or moved with facility to the right or left, as occasion may require, while the plough may be elevated or raised by simply turning the shaft H through the medium of the lever I; and by securing the lever I down in a horizontal position by means of a notched upright, L, or other suitable fastening, the plough may be kept in an elevated position above the surface of the ground, which is necessary in moving the implement or device from place to place. The plough may also be made to penetrate the earth at different depths by securing the lever I in different notches in the upright L.

The device may be constructed at a very moderate cost, and the plough manipulated with the greatest facility by the driver on his seat F.

Having thus described our invention, what we claim as new, and desire to secure by Letters Patent, is—

1. The attaching of the rear part of the plough beam by a chain or rope, $b$, to a pulley, $d$, on a shaft, H, on the hounds $a\ a$ of the draught pole, said shaft H having a lever, I, attached, and all arranged substantially as and for the purpose specified.

2. The slotted plate K attached to the platform D in such a manner that it may be turned forward to embrace the plough handle and serve as a bearing or fulcrum for it, and be turned backward free from the plough handle when it is necessary to liberate the latter, substantially as set forth.

GEORGE BURKET,
SAMUEL M. GASKILL.

Witnesses:
JOHN H. FRENSLER,
CHARLES GARDNER.